(12) United States Patent
Cho et al.

(10) Patent No.: US 9,615,023 B2
(45) Date of Patent: Apr. 4, 2017

(54) FRONT-END EVENT DETECTOR AND LOW-POWER CAMERA SYSTEM USING THEREOF

(71) Applicant: CENTER FOR INTEGRATED SMART SENSORS FOUNDATION, Daejeon (KR)

(72) Inventors: Hyun Tae Cho, Daejeon (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 49 days.

(21) Appl. No.: 14/658,103

(22) Filed: Mar. 13, 2015

(65) Prior Publication Data

US 2016/0269621 A1 Sep. 15, 2016

(51) Int. Cl.
*H04N 5/232* (2006.01)

(52) U.S. Cl.
CPC ................................ *H04N 5/23241* (2013.01)

(58) Field of Classification Search
CPC .................................................. H04N 5/23216
See application file for complete search history.

(56) References Cited

U.S. PATENT DOCUMENTS

| | | | | |
|---|---|---|---|---|
| 7,460,949 B2* | 12/2008 | Wilbrod | ................... | G08G 1/04 340/928 |
| 2008/0186385 A1* | 8/2008 | O | ........................... | H04N 5/765 348/207.99 |
| 2008/0278580 A1* | 11/2008 | Bentkovski | ........ | H04N 5/23203 348/143 |
| 2012/0303215 A1* | 11/2012 | Kim | ....................... | G01D 9/005 701/36 |
| 2013/0166932 A1* | 6/2013 | Iarovici | ................. | G06F 1/3206 713/323 |
| 2013/0271621 A1* | 10/2013 | Lee | ........................ | H04N 5/232 348/222.1 |

\* cited by examiner

*Primary Examiner* — Gevell Selby (57) ABSTRACT

The present invention relates to a front-end event detector for detecting the occurrence of an event before a signal process is generated, and a low power camera system maintaining the low-power mode when idle but activated in normal mode only when the occurrence of an event is detected in the front-end event detector. The front-end event detector according to the present invention comprises: an image sensor for obtaining analog image data and converting them into digital image data; a first buffer memory for storing the digital image data; a first comparator, wherein the next digital image data delivered from the image sensor is compared to the digital image data stored in the first buffer memory for generating activation signals when the occurrence of an event is detected and transmitting them to an external device; an image signal processor for image data processing the digital image delivered from the first comparator.

9 Claims, 7 Drawing Sheets

FRONT-END EVENT DETECTOR AND LOW-POWER CAMERA SYSTEM USING THEREOF

TECHNICAL FIELD

The present invention relates to a front-end event detector and a low power camera system using thereof, more particularly, a front-end event detector for detecting the occurrence of an event before a signal process is generated, and a low power camera system maintaining the low-power mode when idle but activated in the normal mode only when the occurrence of an event is detected in the front-end event detector.

BACKGROUND ART

In general, a monitoring camera or a vehicular black box (event data recorder) performs continuous image recording in order to watch surrounding circumstances. However, such a method of continuous image recording results heavy consumption of battery and storage space, thus devices performing selective image recording through image analysis are recently introduced.

Figure 1:
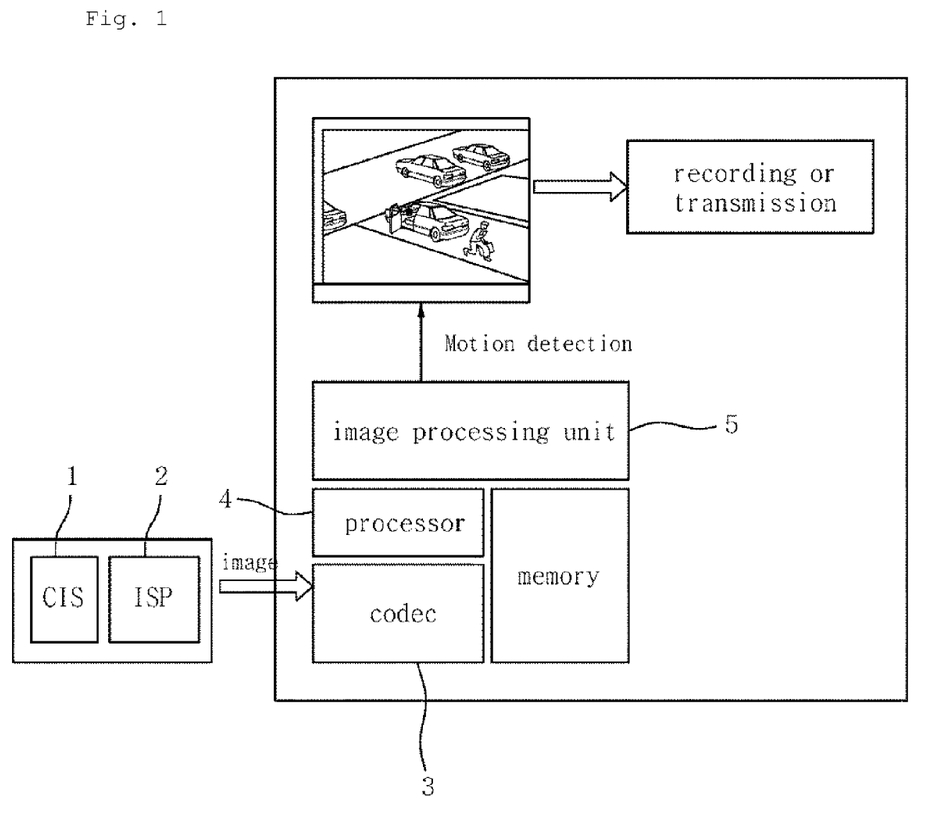
FIG. 1 is a conventional selective image storage apparatus.

FIG. 1 illustrates a conventional selective image storage apparatus, wherein an analog image is converted into a digital signal in CIS(CMOS image sensor 1) and corrected through the certain image process in ISP (Image Signal Processor 2); then after passing through a codec 3 and a process 4, the occurrence of an event is detected through image analysis in an image processing unit 5 only when an event occurs. Although this conventional selective image storage apparatus lowers power consumption compared to a continuous image recording method, it is still problematic because all the components in the apparatus should operate in normal function to detect the occurrence of an event, which still results a certain level of power consumption.

DISCLOSURE

Technical Problem

The present invention is devised to solve problems described hereinbefore and directed to providing a front-end event detector consuming less power to detect the occurrence of an event.

It is also to provide a low power camera system for suppressing power consumption while maintaining the low-power mode when idle, and activated to a normal function by the front-end event detector according to the present invention.

Technical Solution

A front-end event detector according to the present invention comprises: an image sensor for obtaining an analog image data and converting it into a digital image data; a first buffer memory for storing the digital image data; a first comparator for comparing the digital image data stored in the first buffer memory with a next digital image data delivered from the image sensor, and generating activation signals to send them to an external device when the occurrence of an event is detected; an image signal processor for image signal processing the digital image data delivered from the first comparator.

A low power camera system according to the present invention comprises: a front-end event detector according to the present invention; an image processing apparatus maintaining the low-power mode when idle and activated in normal mode when activation signals are delivered from the front-end event detector.

Advantageous Effects

A front-end event detector according to the present invention uses the most primitive form of raw data prior to the image signal processing stage, and therefore the occurrence of an event can be detected with low power consumption.

A low power camera system according to the present invention operates an image processing apparatus only when the front-end event detector transmits activation signals, and therefore low-power operation as well as efficient usage of storage space is available.

DESCRIPTION OF EMBODIMENTS

Hereinafter, a front-end event detector according to the present invention and a low power camera system thereof will be described in more detail with reference to the accompanying drawings.

[Best Mode 1]

Figure 2:
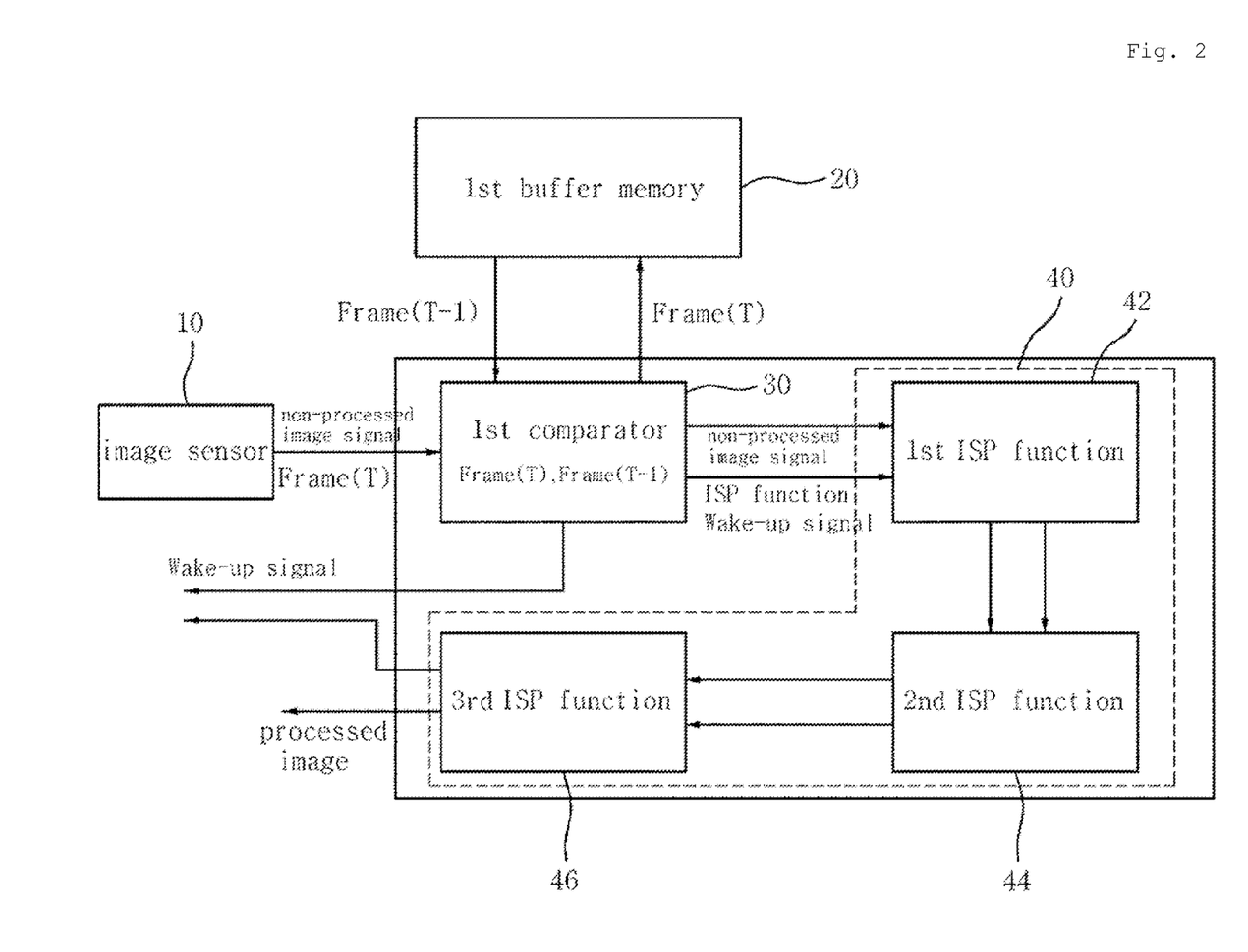
FIG. 2 is a block diagram of a front-end event detector according to the present invention.

FIG. 2 is a block diagram of a front-end event detector according to the present invention.

A front-end event detector according to the present invention is a first exemplary embodiment comprising an image sensor 10, a first buffer memory 20, a first comparator 30, and an image signal processor 40, wherein a second comparator, a second buffer memory and a temporary storage unit may be added.

An analog image data is obtained in the image sensor 10 and converted into a digital image data, wherein the obtained digital image data is stored in the first buffer memory 20.

The first buffer memory 20 is for storing digital images (for example, one frame), wherein the first comparator 30 compares two pieces of digital image data stored in time order. Since the occurrence of an event is detectable by one frame unit, a high-speed low-capacity memory such as SRAM is preferable to be used for the first buffer memory 20 even with the high cost. However, since the accuracy of event detection is higher when comparing a plural number of frames rather than comparing two frames, if manufacturing cost allows, the first buffer memory 20 may have the capacity large enough to store a plural number of frames.

When a next digital image data (for example, next one frame) is delivered from the image sensor 10, the first comparator 30 compares the digital image data stored in the first buffer memory 20 with the delivered digital image data to determine if there occurred a significant change, i.e., a change significant enough to determine the occurrence of an event between the two pieces of digital image data; when the occurrence of an event is detected, it generates activation signals (wake-up signal and ISP function on signal) and transmits them to an external device and the image signal processor 40; and sends the delivered digital image data to the first buffer memory 20 and the image signal processor 40.

The digital image data delivered to the first buffer memory 20 is stored in the first buffer memory 20 for the comparison with the digital image data comes next, and may overwrite the existing digital image data therein.

Figure 3:
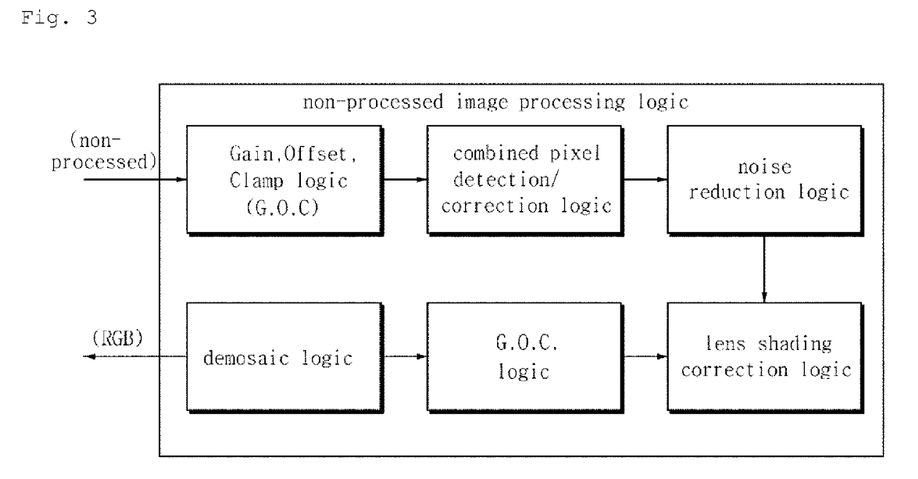
FIG. 3 is an exemplary embodiment of an image signal processor.

The image signal processor 40 is an Image Signal Processing (ISP) component, wherein the digital image data delivered from the first comparator 30 is treated through the processes of interpolation, color correction, gamma correction, noise suppression, demosaic, etc., and comprises at least one or more image processing modules 42, 44, 46. FIG. 3 is an exemplary embodiment of an image signal processor. FIG. 2 illustrates that the first comparator 30 is connected to the front end of the image signal processor 40 connected in series, however, considering the application of system, the allowable energy consumption, the accuracy of an event detection, etc., it may be connected to the rear end of a specific image processing module after going through a certain image signal process. This will be described in detail afterward as another exemplary embodiment.

Activation signals may be generated from one of either the first comparator 30 or the image signal processor 40, and transmitted to an external device. For example, as illustrated in FIG. 2, input signals from the first comparator and input signals from the last output port of the image signal processor are OR-operated, and the result of OR-operation may be transmitted to the external device as activation signals.

The front-end event detector according to the present invention compares pieces of digital image data in the first comparator 30, and delivers the digital image data to the first buffer memory and stores it therein, but does not deliver the digital image data to the image signal processor 40 when the occurrence of an event is not detected. Accordingly, since the image signal processor 40 maintains the low-power mode when idle and is activated in normal mode by activation signals of the first comparator 30, the power consumption is reduced.

Figure 4:
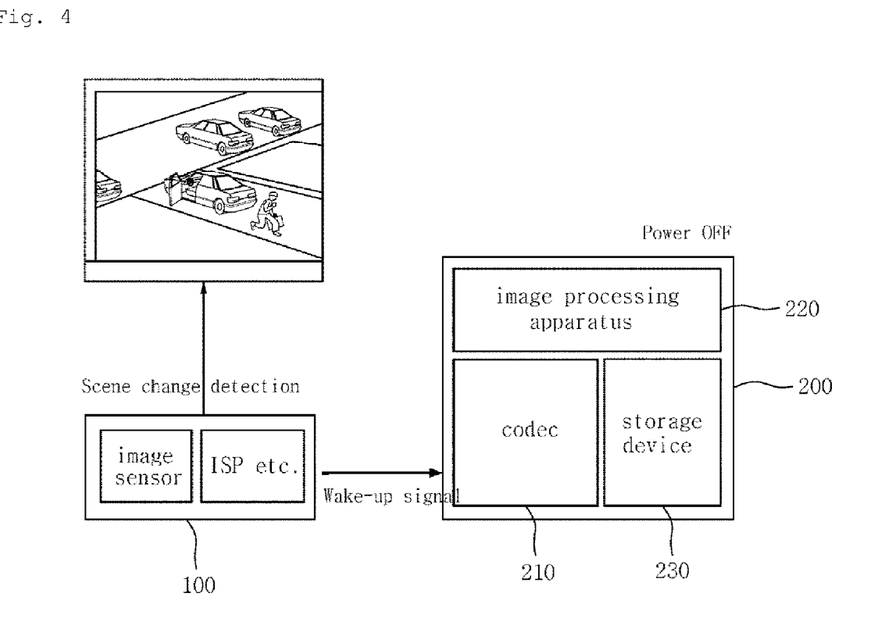
FIG. 4 is a block diagram of a low power camera system according to the present invention.

FIG. 4 illustrates a low power camera system according to the present invention.

A low power camera system according to the present invention comprises: a front-end event detector 100 according to the present invention; an image processing apparatus 200 maintaining the low-power mode when idle and activated in normal mode (normal mode) when activation signals are delivered from the front-end event detector 100. The image processing apparatus 200 comprises a codec 210, an image processing module 220, and a storage device 230.

The front-end event detector 100 of the low power camera system according to the present invention is always in the activation state to detect the occurrence of an event; the image processing apparatus 200 maintains low-power modes such as Off Mode, Sleep Mode, Standby Mode etc., and is switched to Normal mode when activation signals are transmitted from the front-end event detector 100. Therefore, due to maintaining the low-power modes when no event occurs, power consumption is reduced. After switched to Normal mode, in the low power camera system according to the present invention, a digital image data is recorded in the image sensor 10 and signal processed in the image signal processor 40, then delivered to the image processing apparatus 200, wherein the digital image data is compressed, stored, etc., after going through the second stage of event detection and verification process.

Hereinafter, more exemplary embodiments of the front-end event detector according to the present invention will be described.

[Best Mode 2]

Figure 5:
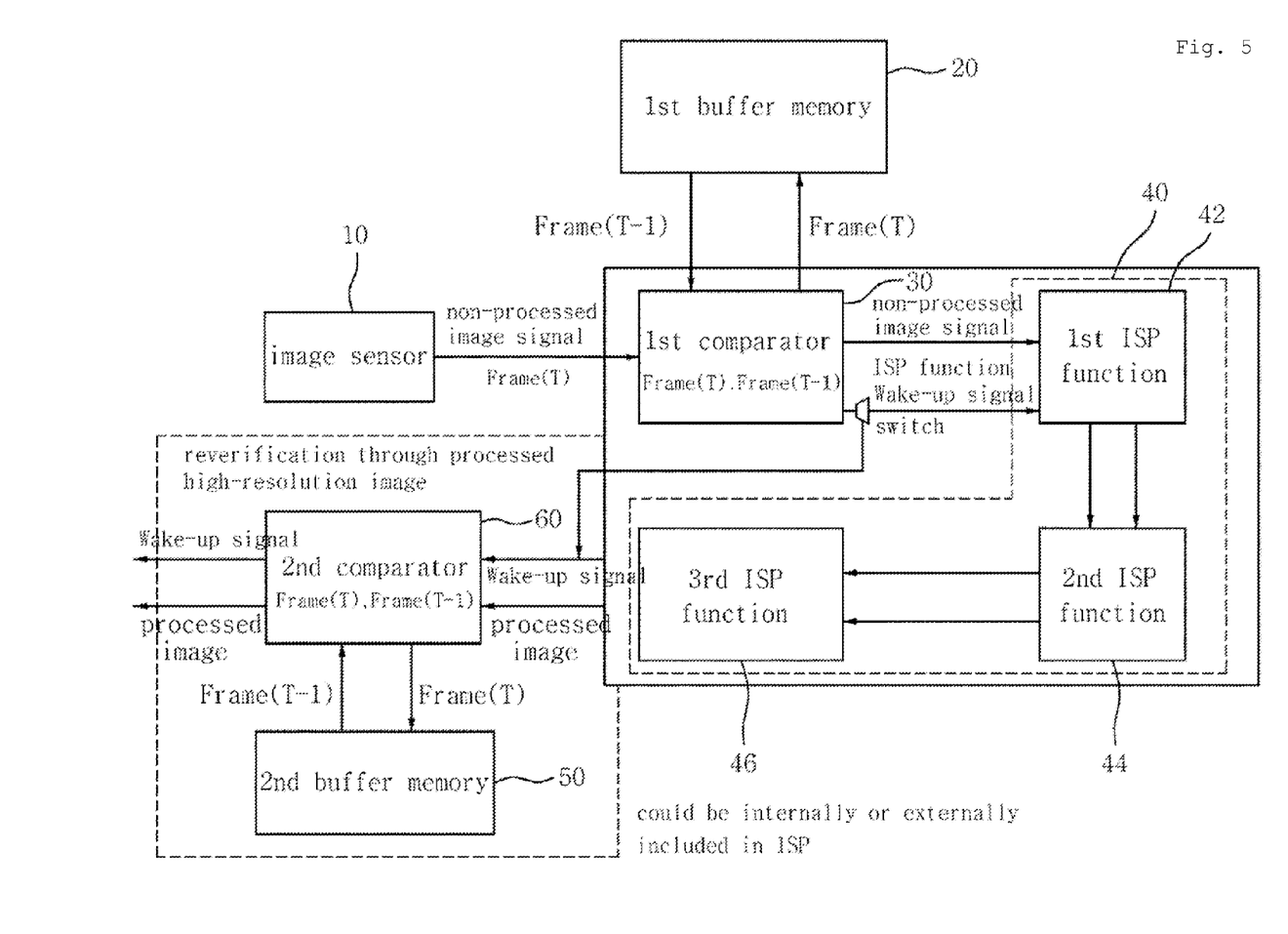
FIG. 5 is a second exemplary embodiment of a front-end event detector according to the present invention.

FIG. 5 illustrates a second exemplary embodiment of the front-end event detector according to the present invention performing the second stage of event detection. Since the first exemplary embodiment illustrated in FIG. 2 detects the occurrence of an event using the most primitive form of raw data prior to the image signal processing stage, there may be possibility of a detection error which is either an event may not be detected under the influence of noise, or an event may be detected when there's no event occurs. An event cannot be recorded in the former case, and there is unnecessary power consumption in the latter case by operating the image processing apparatus 200 in Normal mode.

The front-end event detector illustrated in FIG. 5 is equipped with a second buffer memory 50 and a second comparator 60 in the output port of the image signal processor 40, and performs the second event detection using the digital image data which passed through the image signal processing stage. The operation methods of the second comparator 60 and the second buffer memory 50 are the same as the operation methods of the first comparator 30 and the first buffer memory 20.

A digital image data (for example, one frame) is stored in the second buffer memory 50.

When a next digital image data (for example, next one frame) is delivered from the image signal processor 40, the second comparator 60 compares the digital image data stored in the second buffer memory 50 with the delivered digital image data; generates activation signals when the occurrence of an event is detected; transmits them to an external device; delivers the delivered digital image data to the second buffer memory 50 and an external device. Therefore, in case of the second exemplary embodiment, the first comparator 30 does not generate activation signals.

The digital image data delivered to the second buffer memory 50 is stored in the second buffer memory 50 for the comparison with the next digital image data, and may overwrite the existing digital image data therein.

Here, an algorithm detecting the occurrence of an event from the digital image data in the second comparator 60 may have the higher degree of accuracy than the detecting algorithm of the first comparator 30. In order for the second comparator 60 to detect the occurrence of an event, the image signal processor 40, the second comparator 60, and the second buffer memory 50 need to be activated, however, power consumption already took place for image signal processing, and it is more efficient to improve the accuracy of event detection using the digital image data of which an image correction such as noise removal was already made.

[Best Mode 3]

Figure 6:
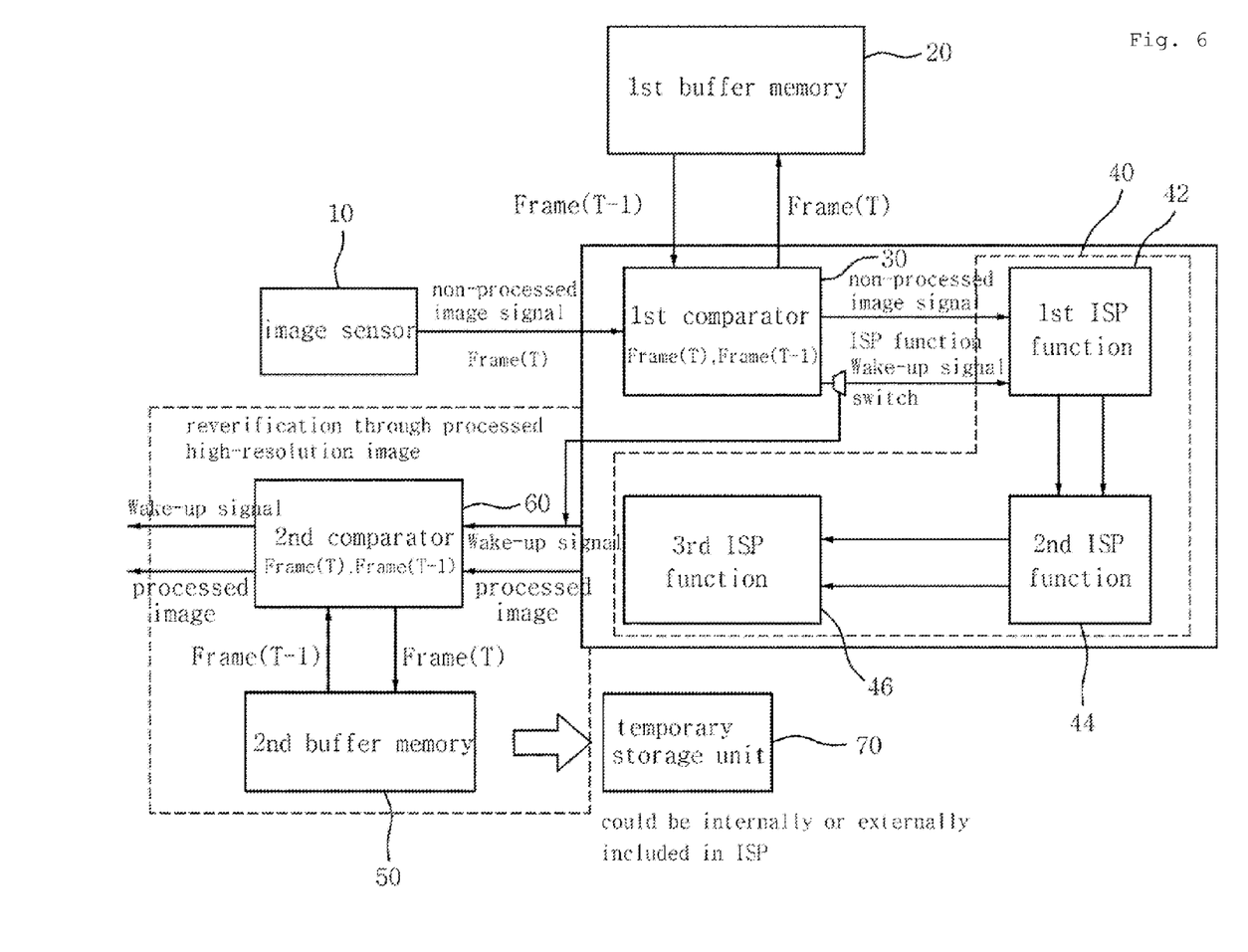
FIG. 6 is a third exemplary embodiment of a front-end event detector according to the present invention.

FIG. 6 illustrates a third exemplary embodiment of the front-end event detector according to the present invention performing the second stage of event detection and buffering. The second exemplary embodiment illustrated in FIG. 5 has the structure, wherein the digital image data is delivered nearly real-time to an external device when the occurrence of an event is detected, and therefore, in certain cases, data may not be delivered efficiently. For example, the digital image data may not be continuously delivered and there may be pauses. In this case, even during the pauses, the external device should continuously maintain the normal mode and thus overall power consumption increases.

The third exemplary embodiment is for reducing inefficiency of this data delivery, and a temporary storage unit 70 is added to the second exemplary embodiment.

The temporary storage unit 70 is connected to the second buffer memory 50 and stores the digital image data delivered from the second buffer memory 50 when the occurrence of an evented is detected. In this case, the range of time to be stored may be a few seconds or minutes. As the range of the time broadens, the efficiency of data delivery improves but the larger capacity of storage is required, thus the range of the time should be properly selected according to the type and frequency of an event.

Since the third exemplary embodiment enables to deliver some extent size of digital image data stored in the temporary storage 70 to the external device continuously, when an external device is combined, the device may operate overall with low power consumption.

[Best Mode 4]

Figure 7:
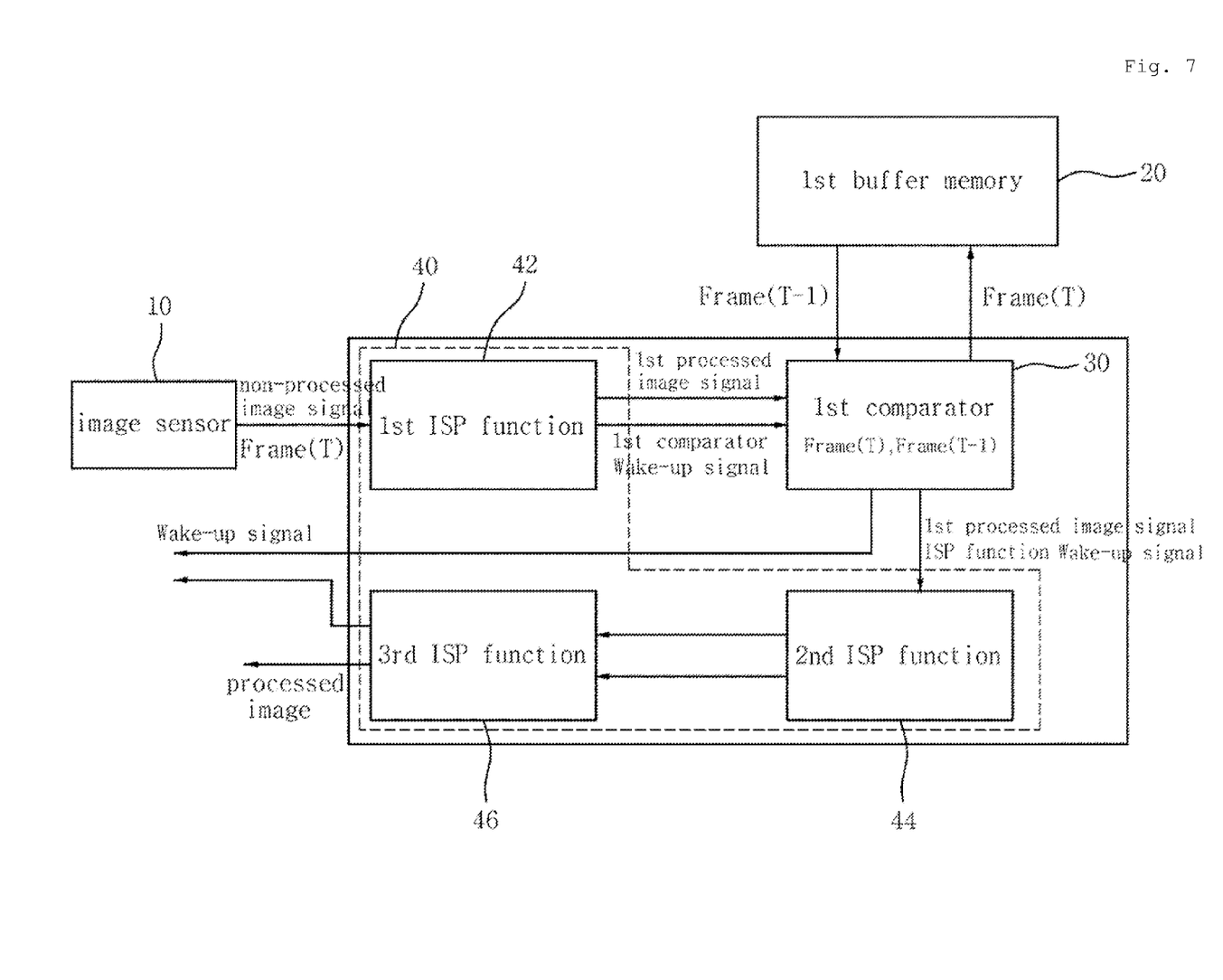
FIG. 7 is a fourth exemplary embodiment of a front-end event detector according to the present invention.

FIG. 7 illustrates a fourth exemplary embodiment of the front-end event detector according to the present invention, wherein the occurrence of an event is detected at the rear end of a specific image processing module.

Since the first exemplary embodiment illustrated in FIG. 2 detects the occurrence of an event using the most primitive form of raw data prior to the image signal processing stage, there may be possibility of detection errors. The fourth exemplary embodiment is structured to lower the possibility of detection errors while suppressing power consumption, and detects the occurrence of an event in the comparator 20 after passing through a certain image signal processing stage. Because the fourth exemplary embodiment is configured to utilize the image processing modules 42, 44, 46 that are already provided, it takes advantage of reducing the number of parts compared to the second exemplary embodiment additionally equipped with the second buffer memory 50 and the second comparator 60 for reducing detection errors.

The fourth exemplary embodiment of the front-end event detector according to the present invention comprises: an image sensor 10; a first image processing module 42 receiving digital image data from the image sensor 10 in a constantly turned-on state; a first buffer memory 20 for storing image signals one-time processed in the first image processing module 42; a first comparator 30, wherein when the next one-time processed digital image data (for example, next one frame) is delivered from the first image processing module 42, the digital image data stored in the first buffer memory 20 and the delivered digital image data are compared to determine the significance of change between the two digital image data, in which when the change is considered as the occurrence of an event, activation signals (wake-up signal and ISP function-on signal) are generated and transmitted to an external device as well as the next image processing module that is a second image processing module 44, and then the delivered digital image data is sent to the first buffer memory 20. Accordingly, since the second image processing module 44 maintains the low-power mode when idle and is activated in normal mode by activation signals of the first comparator 30, the power consumption is reduced.

The fourth exemplary embodiment is described to have the first buffer memory 20 and the first comparator 30 formed in the rear end of the first image processing module 42, however, upon the necessity, they may be formed in the rear end of the second image processing module 44 or in that of a third image processing module 46.

[Best Mode 5]

Figure 8:
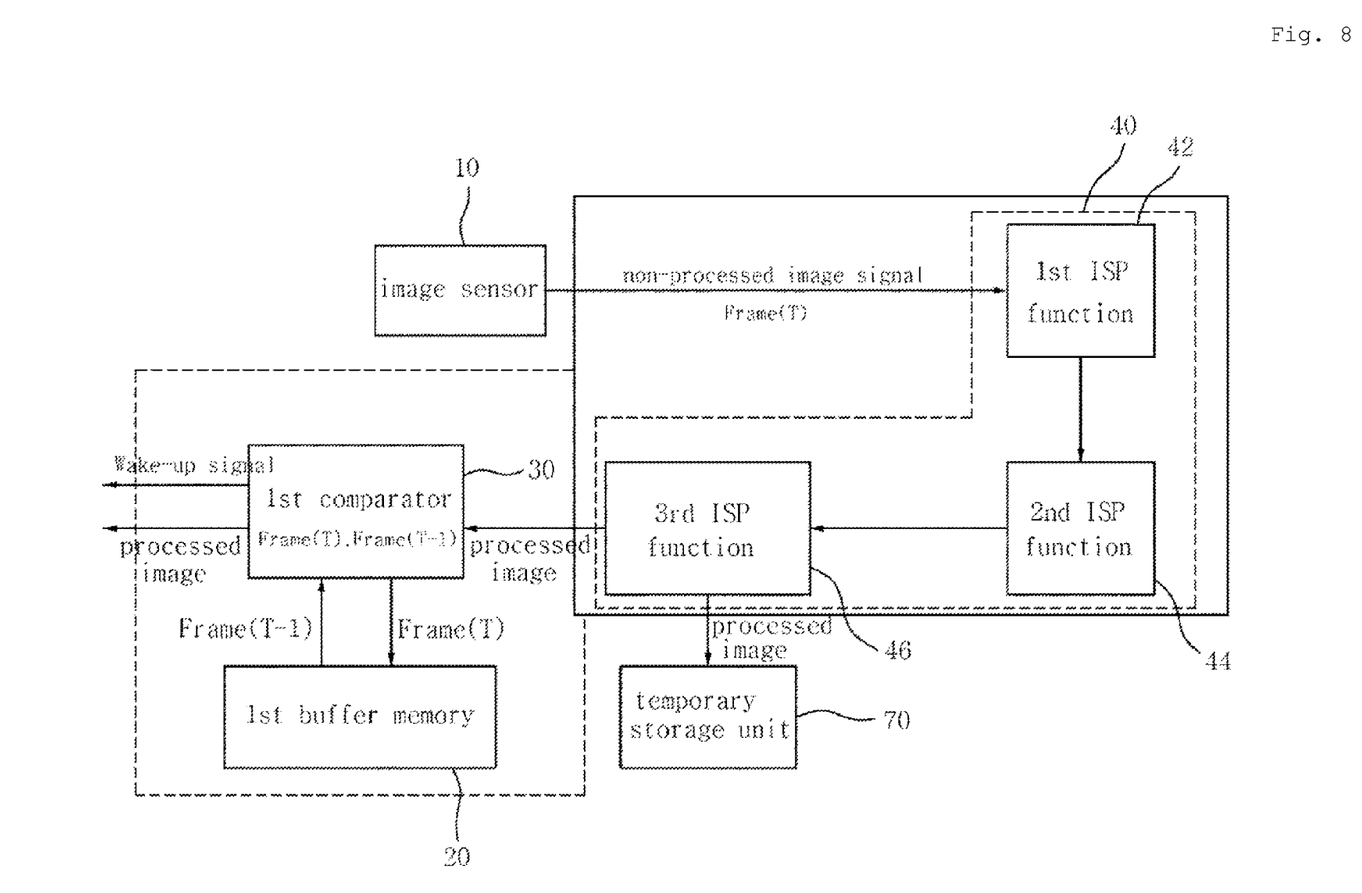
FIG. 8 is a fifth exemplary embodiment of a front-end event detector according to the present invention.

The FIG. 8 is the final stage of the fourth exemplary embodiment illustrating a fifth exemplary embodiment of the front-end event detector according to the present invention, wherein the first buffer memory 20 and the first comparator 30 are formed in the rear end of the last image processing module i.e., the output port of the image signal processor 40, and may be used for a vehicular black box or a CCTV.

The fifth exemplary embodiment of the front-end event detector according to the present invention illustrated in FIG. 8 may be used as a vehicular black box or CCTV mode. Due to sufficient power available from a constant power supply, an automobile, etc., the low-power mode for a vehicular black box or a CCTV is less demanding, but a sufficient storage to store images before and after an event is required.

The fifth exemplary embodiment comprises: an image sensor 10; an image signal processor 40 for receiving digital image data from the image sensor and image signal processing it; a first buffer memory 20 for storing processed images treated in the image signal processor 40; a first comparator 30, wherein when a next digital image data (for example, next one frame) is delivered from the image signal processor 40, the digital image data stored in the first buffer memory 20 and the delivered digital image data are compared to detect the occurrence of an event, and activation signals (wake-up signal) are generated and transmitted to an external device when an event is detected, then the delivered digital image data is sent to the first buffer memory 20; a temporary storage unit 70 for constantly storing the processed image treated in the image signal processor 40.

In the fifth exemplary embodiment, the image signal processor 40 always operates in an activation state and the digital image data recorded in the image sensor 10 is directly delivered to the image signal processor 40. Therefore, constantly image signal processed images are output in the output port of the image signal processor 40, and the temporary storage unit 70 connected to the output port of the last image signal processor 40 constantly stores processed images. The reason for selecting this operation is that a vehicular black box or a CCTV is required to store situations prior to the occurrence of an event, and therefore the temporary storage unit 70 is required to store the digital image data prior to the occurrence of an event.

A front-end event detector according to the present invention is not limited on power consumption, and thus it may be utilized even when an image processing apparatus is constantly in a normal operation state. For example, by attaching activation signals of the front-end event detector using metadata format to the digital image data stored in a storage device of the image processing apparatus, later on when searching, compressing, and editing the stored digital image, easy operations may be available by referring activation signals.

DESCRIPTION OF REFERENCE NUMERALS

10 image sensor
20 first buffer memory
30 first comparator
40 image signal processor
42, 44, 46 image processing module
50 second buffer memory 60 second comparator
70 temporary storage unit
100 front-end event detector according to the present invention
200 image processing apparatus
210 codec
220 image processing module
230 storage device

What is claimed is:

1. A front-end event detector comprising:
an image sensor for obtaining analog image data and converting it into digital image data;
a first buffer memory for storing the converted digital image data;
a first comparator comparing next digital image data delivered from the image sensor to the digital image data stored in the first buffer memory for generating first activation signals when an occurrence of an event is detected and transmitting the first activation signals to an external device;
an image signal processor for image data processing digital image delivered from the first comparator,
wherein an output port of the image signal processor is additionally equipped with a second comparator and a second buffer memory, and
wherein the second comparator compares digital image data stored in the second buffer memory and digital image data delivered from the image signal processor for generating second activation signals when an occurrence of an event is detected and transmitting the second activation signals to the external device.

2. The front-end event detector of claim 1,
wherein the image signal processor maintains a low-power mode when idle and is activated in a normal mode by the first activation signals of the first comparator.

3. The front-end event detector of claim 1,
wherein the first comparator does not generate the first activation signals.

4. The front-end event detector of claim 1,
wherein an algorithm detecting an occurrence of an event in the second comparator has a higher degree of accuracy than a detecting algorithm of the first comparator.

5. The front-end event detector of claim 1, further comprising:
a temporary storage unit connected to the second buffer memory, the temporary storage unit storing digital image data delivered from the second buffer memory within a certain range of time when an occurrence of an event is detected.

6. The front-end event detector of claim 1,
wherein an amount of the processed image is one frame.

7. A low power camera system comprising:
the front-end event detector of claim 1; and
an image processing apparatus maintaining a low-power mode when idle, but is activated in a normal mode when the first activation signals, the second activation signals, or the first and second activation signals are delivered from the front-end event detector.

8. The low power camera system of claim 7,
wherein the image processing apparatus comprises a codec, an image processing module, and a storage device.

9. The low power camera system of claim 7,
wherein the low-power mode is any one mode of a shut-down mode, a sleep mode, or a stand-by mode.

* * * * *